Patented Dec. 20, 1949

2,491,923

UNITED STATES PATENT OFFICE 2,491,923

STRATIFIED POLYVINYL CHLORIDE FILMS AND PROCESSES OF MAKING SAME

Charles C. Johnson, Newburgh, N. Y., assignor to E. I. du Pont de Nemours & Company, Wilmington, Del., a corporation of Delaware No Drawing. Application July 2, 1946, Serial No. 681,150

7 Claims. (Cl. 117—76)

This invention relates to resin films, and particularly to such films which are stain resistant and have little or no effect on other finishing compositions when superimposed thereon.

Synthetic resin coated fabrics and unsupported films, particularly those made with polyvinyl chloride have achieved widespread use in recent years where cellulose derivative coated fabrics have been used in the past. The new synthetic resin coated fabrics and unsupported films are generally superior to cellulose derivative coated fabrics and films in their long-wearing qualities, resistance to cracking on repeated flexing at low temperatures, leather-like feel and appearance. However, improvement is desired in the polyvinyl chloride resin materials for certain applications. Polyvinyl chloride resin coatings have been stratified with the top or surface portion containing less plasticizer than the underneath portion in order to obtain supple materials with dry non-tacky finishes. The polyvinyl chloride resin plasticizers will migrate throughout the entire coating with resultant change in the finish of the surface layer. Another disadvantage of the plasticized films of polyvinyl chloride resin is the effect such films have on other finishes when they are superimposed thereon. Plasticized polyvinyl chloride resin films when placed in contact with lacquer type finishes will mar the lacquer finish as a result of the migration of plasticizer in the polyvinyl chloride resin film to the lacquer film exerting a solvent action on the latter. This condition is detrimental when articles fabricated from the plasticized polyvinyl chloride resin compositions such as e. g., ladies' pocketbooks, table covers, book covers, various covered cases, etc., are placed on lacquered surfaces such as show cases and home furniture. A further disadvantage of the present day polyvinyl chloride resin coated fabric and unsupported film in light colors for use as ladies' handbags is that the material is not resistant to permanent staining by colored cosmetics. Also, table covers made from plasticized polyvinyl chloride resin compositions are not resistant to permanent staining by certain foodstuffs, such as e. g., mustard, catsup, coffee, turmeric, beets, cocoa, fruit juices, fats and oils, etc. A still further disadvantage of the plasticized polyvinyl chloride resin films for use as book covers is that standard commercial printing inks will not dry when printed on the surface of the films as is common practice in the bookbinding art.

It has been discovered that the aforementioned disadvantages of the prior art material results from the presence of the plasticizer which is an essential component of the flexible polyvinyl chloride resin films. It has been discovered that if an unplasticized polyvinyl chloride surface coat is applied over a plasticized polyvinyl chloride resin film, there is considerable initial improvement with respect to marring lacquer finishes when in contact therewith as well as resistance to permanent staining by colored cosmetics and foodstuffs. However, such advantage is not permanent since the plasticizer will migrate throughout the coating and into the surface coat and the initial improvement is nullified.

This invention, therefore, has as a primary object the minimization or elimination of the aforementioned disadvantages inherent in the present day materials, while at the same time preserving and utilizing all the aforesaid advantageous properties thereof. A more specific object is to provide a plasticized polyvinyl chloride resin film, supported or unsupported, which is resistant to staining by colored cosmetics, foodstuffs, etc. A still more specific object is the provision of a plasticized polyvinyl chloride resin film which is innocuous to lacquer type finishes and printing inks used in the bookbinding art. These objectives as well as other important objects will become readily apparent to those skilled in the art as the description of the invention proceeds.

These above mentioned objects are accomplished according to this invention by providing a stratified polyvinyl chloride resin film containing a plasticizer in the substratum which will not migrate into the surface stratum of unplasticized polyvinyl chloride which is resistant to staining.

A non-migrating plasticizer for the polyvinyl chloride resin films has been found to be polypropylene glycol sebacate.

The following specific examples are given by way of illustration and not limitation:

EXAMPLE I

A woven cotton fabric running 2.10 yards per pound per 60" width was coated on one side with a plurality of coats of the following composition:

*Base coating composition*

| | Per cent |
|---|---|
| Polyvinyl chloride | 10.9 |
| Polypropylene glycol sebacate [1] | 8.6 |
| Methyl ethyl ketone | 80.5 |

[1] A suitable plasticizer of this type is sold as "Paraplex G-25" by Resinous Products and Chemical Co., Philadelphia, Pa.

The polyvinyl chloride was dispersed in the methyl ethyl ketone at a temperature of 160–170° F.

Sufficient doctor knife applications of the above composition were applied to the cloth to deposit approximately two to three ounces of the nonvolatile components per square yard. After each successive coat the material was passed through a heated chamber to expel the volatile solvent. The dry material was given a heat and pressure treatment by passing between heated smooth pressure rolls commonly referred to as calender rolls to smooth the coating and effect greater bond between the fabric and coating. A colored decorative design was printed on the surface by means of an intaglio print roller. The formula of the printing ink was as follows:

*Printing ink composition*

| | Per cent |
|---|---|
| Polyvinyl chloride | 8.3 |
| Pigments | 13.0 |
| Polypropylene glycol sebacate | 14.5 |
| Cyclohexanone | 14.9 |
| Methyl ethyl ketone | 38.8 |
| Methyl isobutyl ketone | 5.5 |

The pigments were previously ground in the plasticizer and the resin was dispersed separately in the methyl ethyl ketone at a temperature of 160–170° F. The printed material was passed through a heated chamber to expel the volatile solvent. Additional coating of the plasticized base coating described above was applied over the printed surface to deposit approximately ½ ounce of dry coating per square yard to protect the colored print design from crocking. A final surface coat of an unplasticized composition was applied to deposit approximately ½ ounce of dry coating per square yard, the formula of which was as follows:

*Surface composition*

| | Per cent |
|---|---|
| Polyvinyl chloride resin | 12.5 |
| Silica gel | 1.1 |
| Methyl ethyl ketone | 86.4 |

The above composition was prepared by first dispersing a 5.1% solution of polyvinyl chloride resin in hot (160–170° F.) methyl ethyl ketone. A second dispersion was prepared by ball milling 93.4 parts of the 5.1% polyvinyl chloride resin solution with 6.6 parts of silica gel, then combining the ball mill dispersion with a 14% polyvinyl chloride solution in the ratio of 16.7 parts of the ball mill dispersion and 83.3 parts of the 14% solution. A suitable grade silica gel for this purpose is a material obtained on the open market under the trade name "Santocel" as supplied by Monsanto Chemical Company.

After the unplasticized surface coat was applied to the coated fabric and passed through a heated chamber to expel the volatile solvent, the material was ready for use.

The silica gel was present in the above formula to give a mat finish and enhance the appearance of the coated fabric.

The table cover material produced as described above was tested for stain resistance by applying the following materials on the surface of the film, coffee brew, catsup, mustard, and red "lipstick" which were allowed to remain on the coating for 24 hours after which the staining materials mentioned above were removed with a clean cloth and left no stains on the coating. A swatch of the coated fabric was placed on a lacquer finished wooden panel with the coating in contact with the lacquer. A glass plate was placed over the swatch and a weight corresponding to 1 pound per square inch on the coated fabric was placed on the glass plate. The coated fabric was left in contact with the lacquered finish for one week and there was no marring of the lacquered finish covered with the coated fabric.

The same tests were repeated after 8 months' time without any change in the initial results, thus indicating that the plasticizer in the substratum had not migrated into the surface stratum.

EXAMPLE II

A similar table cover material as described in Example I was produced except the final surface coat of the unplasticized film was replaced with the following composition:

| | Per cent |
|---|---|
| Polyvinyl chloride | 10.1 |
| Methyl ethyl ketone | 81.6 |
| Polypropylene glycol sebacate | 7.4 |
| Silica gel | 0.9 |

This material was subjected to the same tests as the material described in Example I and the colored cosmetic and foodstuffs left permanent stains on the coating.

EXAMPLE III

A bookbinding material was prepared as described below:

A woven cotton fabric having a sateen weave running 1.32 yards per pound per 53" width was first coated on one side with the following composition:

| | Per cent |
|---|---|
| Copolymer of 90 parts polyvinyl chloride and 10 parts polyvinyl acetate | 23.1 |
| Polypropylene glycol sebacate | 23.0 |
| Methyl ethyl ketone | 53.9 |

Sufficient coats of the above composition were applied to deposit approximately 1½ ounces per square yard of non-volatile components. The solvents were removed by passing through a heated chamber. The copolymer resin was used in the first coat to assure a firm bond of the coating to the fabric.

The fabric was further coated with the following composition:

| | Per cent |
|---|---|
| Polyvinyl chloride | 9.4 |
| Bone black pigment | 4.2 |
| Barytes | 5.9 |
| Polypropylene glycol sebacate | 9.3 |
| Methyl ethyl ketone | 71.2 |

The above compositions were prepared in the same manner as outlined in Example I. Sufficient coats of the pigmented composition were applied to deposit approximately 11.5 ounces per square yard of the non-volatile components. After each successive coat the volatile component was evaporated by passing through a heated chamber. A final surface coat of the following composition was applied to the coated fabric:

| | Per cent |
|---|---|
| Polyvinyl chloride | 11.9 |
| Methyl ethyl ketone | 88.1 |

Approximately one ounce of the non-volatile component of the above composition was deposited on the surface of the coated fabric. After removing the volatile solvent by passing through a heated chamber the coating was embossed by passing between heated pressure rolls in which one roll carried a design on the surface. The above described coated fabric was then made into book covers.

A portion of the embossed design in the coating of the book cover was blank stamped by pressing a hot smooth plate against the coated surface to smooth out or remove the embossed design for the area to be subsequently printed.

Sometimes it is desirable to use an interliner such as cellophane or "holland cloth" between the hot plate and the coated surface during the blank stamping operation to prevent the coating from adhering to the hot plate. A design was printed on the smooth blanked area of the book cover with standard commercial air-drying printing inks such as described by McBurney et al. in U. S. Patent 2,049,507, which issued August 4, 1936.

The printed surface was allowed to dry overnight. The dried printing ink was firmly bonded to the coating and could not be removed by hard scratching with the fingernail.

EXAMPLE IV

A bookbinding material was produced as outlined in Example III except the final unplasticized surface coat was omitted entirely. The material was made up into a book cover and printed as outlined in Example III. After the printing ink was allowed to dry overnight, it was readily removed by scratching with the fingernail.

In the foregoing examples the coating compositions may be applied to the fabric base by means of an apparatus such as disclosed by W. T. Anderson in U. S. Patent 2,107,276, issued February 8, 1936. The volatile solvents may be evaporated by passing through a drying tunnel such as disclosed by W. T. Anderson et al., in U. S. Patent 2,107,275, issued February 8, 1936.

Throughout the description of the invention reference has been made to polyvinyl chloride resin as the film forming ingredient of the various coating compositions. It is within the scope of this invention to use modified polyvinyl chloride resins such as e. g., copolymers obtained by polymerizing vinyl chloride monomers with other monomers copolymerizable therewith, such as diesters of fumaric or maleic acid including dimethyl, diethyl, dibutyl, dipropyl fumarate and maleate; copolymers of vinyl chloride and esters of acrylic acid, copolymers of vinyl chloride and vinylidene chloride, and copolymers of vinyl chloride and vinyl esters of organic acids such as vinyl acetate. In addition to the above mentioned resins, the compositions of this invention may be prepared with acrylic and methacrylic esters in polymeric form as the film forming ingredient.

The resins mentioned in the foregoing paragraph are referred to as polyvinyl resins in the appended claims.

It is within the scope of this invention to add pigments to the unplasticized surface coating compositions. This can be accomplished by first ball milling a portion of the volatile solvent and pigment before adding to the hot solution of the resin.

While the invention has been described in detail with respect to the manufacture of coated fabrics, it will also find wide utility in the production of unsupported films made by processes other than spreading hot solutions of the compositions such as e. g., calendering the compositions in the form of sheets as is the practice in the rubber industry.

The invention has been described with respect to tablecloth material resistant to staining and bookbinding material which permits printing on the surface with standard commercial printing inks. In addition to these products, the invention will also be useful in producing such materials as upholstery, ladies' pocketbooks, case coverings, luggage material, etc.

It is apparent that many widely different embodiments of this invention may be made without departing from the spirit and scope thereof, and therefore, it is not intended to be limited except as indicated in the appended claims.

I claim:

1. The process of preparing bookbinding material and the like which comprises coating a woven fabric on one side with a plurality of coats having the following composition:

|  | Per cent |
|---|---|
| Polyvinyl chloride | 10.9 |
| Polypropylene glycol sebacate | 8.6 |
| Solvent | 80.5 | until about 2 to 3 ounces of non-volatile components per square yard are applied, expelling the volatile solvents, and thereafter applying a surface composition having the following formula:

|  | Per cent |
|---|---|
| Polyvinyl chloride | 12.5 |
| Silica gel | 1.1 |
| Solvent | 86.4 |

2. A stratified film comprising a plurality of polyvinyl chloride strata, one of the said strata containing polypropylene glycol sebacate as a plasticizer for the resin and the other stratum containing an unplasticized polyvinyl chloride resin.

3. The product of claim 2 in which the polyvinyl chloride resin of one stratum is a homopolymer.

4. A non-staining table cover material comprising a fabric base coated with a stratified resin film comprising a plurality of polyvinyl chloride resin strata, one of the said strata containing polypropylene glycol sebacate as a plasticizer for the resin and the other stratum containing an unplasticized polyvinyl chloride resin.

5. The product of claim 4 in which the polyvinyl chloride resin of one stratum is a homopolymer.

6. A book-binding material comprising a fabric base coated with an adherent stratified film comprising a plurality of polyvinyl chloride resin strata, one of which contains polypropylene glycol sebacate as a plasticizer for the resin and is in contact with the fabric base, the other stratum containing an unplasticized polyvinyl chloride resin, said stratified film being innocuous to air-drying printing inks.

7. The product of claim 6 in which the polyvinyl chloride resin of one stratum is a homopolymer.

CHARLES C. JOHNSON.

REFERENCES CITED

The following references are of record in the file of this patent:

UNITED STATES PATENTS

| Number | Name | Date |
|---|---|---|
| 2,086,428 | Mock | July 6, 1937 |
| 2,176,997 | Marini | Oct. 24, 1939 |
| 2,263,900 | Nollau | Nov. 25, 1941 |
| 2,312,913 | Kirby | Mar. 2, 1943 |

OTHER REFERENCES

The Resinous Reporter, a publication of the Resinous Products and Chem. Co., Philadelphia, Pa., Feb. 1944, page 8.

Chem. and Eng. News, Dec. 10, 1944, advertisement by the Resinous Products and Chem. Co., page 2115.